US010016827B2

(12) United States Patent
Sheen et al.

(10) Patent No.: US 10,016,827 B2
(45) Date of Patent: Jul. 10, 2018

(54) MODIFIED TOOTH PROPORTION GEAR CUTTER

(71) Applicant: Eaton Corporation, Cleveland, OH (US)

(72) Inventors: Benjamin S. Sheen, Schoolcraft, MI (US); Carlos H. Wink, Portage, MI (US)

(73) Assignee: Eaton Corporation, Cleveland, OH (US)

( * ) Notice: Subject to any disclaimer, the term of this patent is extended or adjusted under 35 U.S.C. 154(b) by 262 days.

(21) Appl. No.: 14/689,260

(22) Filed: Apr. 17, 2015

(65) Prior Publication Data

US 2016/0067804 A1 Mar. 10, 2016

Related U.S. Application Data (60) Provisional application No. 62/045,793, filed on Sep. 4, 2014.

(51) Int. Cl.
*B23F 21/12* (2006.01)
*B23F 1/06* (2006.01)
*B23F 21/10* (2006.01)
*B23F 5/16* (2006.01)

(52) U.S. Cl.
CPC ............. *B23F 21/122* (2013.01); *B23F 1/06* (2013.01); *B23F 5/163* (2013.01); *B23F 21/10* (2013.01)

(58) Field of Classification Search
CPC .... B23F 1/06; B23F 9/10; B23F 9/105; B23F 9/12; B23F 21/22; B23F 21/223; B23F 17/005; B23F 5/163; B23F 5/065; Y10T 29/49467; Y10T 29/49476; Y10T 29/49995
USPC ..... 29/893.3, 893.35, 557; 409/8–10, 25–28, 409/31, 38, 39, 50, 51, 56
See application file for complete search history.

(56) References Cited

U.S. PATENT DOCUMENTS

| 2,091,575 | A | * | 8/1937 | Wildhaber | ................ B23F 9/10 409/26 |
| 3,371,395 | A | * | 3/1968 | Wildhaber | .............. B23F 21/10 407/28 |
| 3,718,052 | A | * | 2/1973 | Barr | ........................ F16H 55/26 29/893.31 |
| 2002/0192044 | A1 | * | 12/2002 | Simon | ....................... B23F 1/06 409/26 |

(Continued)

FOREIGN PATENT DOCUMENTS

| EP | 2422920 A2 * | 2/2012 | .............. B23F 5/163 |
| EP | 2474379 A1 * | 7/2012 | .............. B23F 5/163 |

(Continued)

*Primary Examiner* — Nicole N Ramos
(74) *Attorney, Agent, or Firm* — RMCK Law Group PLC (57) ABSTRACT

An exemplary modified tooth proportion gear cutter includes a gear cutter that has a plurality of cutting teeth, and each one of the cutting teeth has a pair of cutting edges configured to cut a gear in a blank orientation so as to provide the gear in a final orientation. The gear in its final orientation has an involute tooth profile including a plurality of cut teeth and a plurality of valleys therebetween. The cutting edges are configured to cut the gear in the blank orientation, such that the gear in the final orientation includes the involute tooth profile with an active profile section and an operating pitch diameter that is spaced apart from the active profile section.

10 Claims, 5 Drawing Sheets

(56) References Cited

U.S. PATENT DOCUMENTS

2008/0115610 A1* 5/2008 Cisek .................... F16H 55/088
74/462

FOREIGN PATENT DOCUMENTS

| EP | 2537616 A1 * | 12/2012 | .............. B23F 5/163 |
| GB | 898626 A * | 6/1962 | .............. B23F 5/065 |

* cited by examiner

//github.com/MODIFIED TOOTH PROPORTION GEAR CUTTER

CROSS-REFERENCE TO RELATED APPLICATIONS

This application claims the benefit of U.S. Provisional Application No. 62/045,793, filed Sep. 4, 2014, the full disclosure of which is hereby incorporated by reference herein.

BACKGROUND

Gear manufacturers utilize various machining processes and corresponding tools to produce gears. Exemplary processes can include hobbing, shaping, milling, shear cutting and grinding. The process selected by the gear manufacturer can depend on the type of gear being machined and the tolerances within which the gear is produced. Other considerations in selecting the method can include the size of the gear, the configuration of integral sections or flanges, the quantity of gears to be produced, and gear-to-pinion ratio and costs.

As one example, internal gears have involute tooth profiles, which can be provided by casting, shaping with a formed tool or milling with a formed milling cutter. Furthermore, accurate internal gears can be produced with greater precision by a pinion-shaped cutter or Fellow's cutter. However, the Fellow's cutter still merely provides an approximation of an involute tooth profile. Moreover, the size of the Fellow's cutter can determine certain restrictions on the tooth proportions of the internal gear in its final orientation. For instance, if the cutter is too large, the tips of two or more teeth in the internal gear can be inadvertently trimmed as the cutter is fed to depth. For that reason, smaller special cutters can be utilized; however, if the cutter is too small, imperfect tooth forms can be developed on the internal gear in its final orientation. Thus, special cutters and special cutting systems may be required to produce an internal gear having only an approximate tooth profile.

The internal gear in its final orientation may be configured to have an operating pitch diameter during the manufacturing process that is disposed within its involute tooth profile, thus reducing the accuracy by which the gear is produced. In particular, the cutter may cut the gear in the blank orientation in opposite directions along different portions of the same tooth face. For that reason, the cutter may be stationary with respect to the tooth face when the point of contact is aligned with the operating pitch diameter. Furthermore, when the point of contact is disposed radially outward from the operating pitch diameter, the cutter may apply a force in one direction along the face of the tooth, and when the point of contact is disposed radially inward from the operating pitch diameter, the cutter may apply a force in the opposite direction along the same face of the tooth. Thus, the cutter may cut the gear in multiple directions along one face of the same tooth and apply a non-constant force that increases or decreases along the same tooth face, which can in turn produce an imprecise involute tooth profile that is not within specification requirements.

It is therefore desirable to provide a cutter that can utilize a generally constant cutting tool force to produce a precision internal gear.

BRIEF DESCRIPTION OF THE DRAWINGS

Referring now to the drawings, exemplary illustrations are shown in detail. Although the drawings represent examples, the drawings are not necessarily to scale and certain features may be exaggerated or schematic to better illustrate and explain an innovative aspect of an illustrative example. Further, the exemplary illustrations described herein are not intended to be exhaustive or otherwise limiting or restricting to the precise form and configuration shown in the drawings and disclosed in the following detailed description. Exemplary illustrations are described in detail by referring to the drawings as follows.

DETAILED DESCRIPTION

An exemplary involute gear cutter system (hereinafter "system") includes a computer numerically controlled (CNC) lathe and a modified tooth proportion gear cutter (hereinafter "cutter") configured to cut a gear in a blank orientation to remove shavings from the gear in multiple passes so as to produce a precision gear in its final orientation. The CNC lathe includes a chuck and an active sub-spindle, i.e. controlled rotating motion through CNC controls. The cutter can be mounted on the spindle, and the gear in the blank configuration may be attached to the chuck. More specifically, the cutter can have a plurality of cutting teeth, and each one of the cutting teeth can have a pair of cutting edges configured to cut the gear in the blank orientation to provide the gear in the final orientation. In the final orientation, the gear has an involute tooth profile including a plurality of cut teeth and a plurality of valleys therebetween. The cutting edges may be configured to cut the gear in the blank orientation, such that the gear in the final orientation includes an active profile section and an operating pitch diameter that are spaced apart from one another. Thus, the cutter can apply a generally constant force in a single or unilateral direction along the surface of the gear to increase the accuracy of machining the gear within, for example, a 0.0010 inch tolerance, without requiring special cutting tools or cutting systems.

Figure 1A:
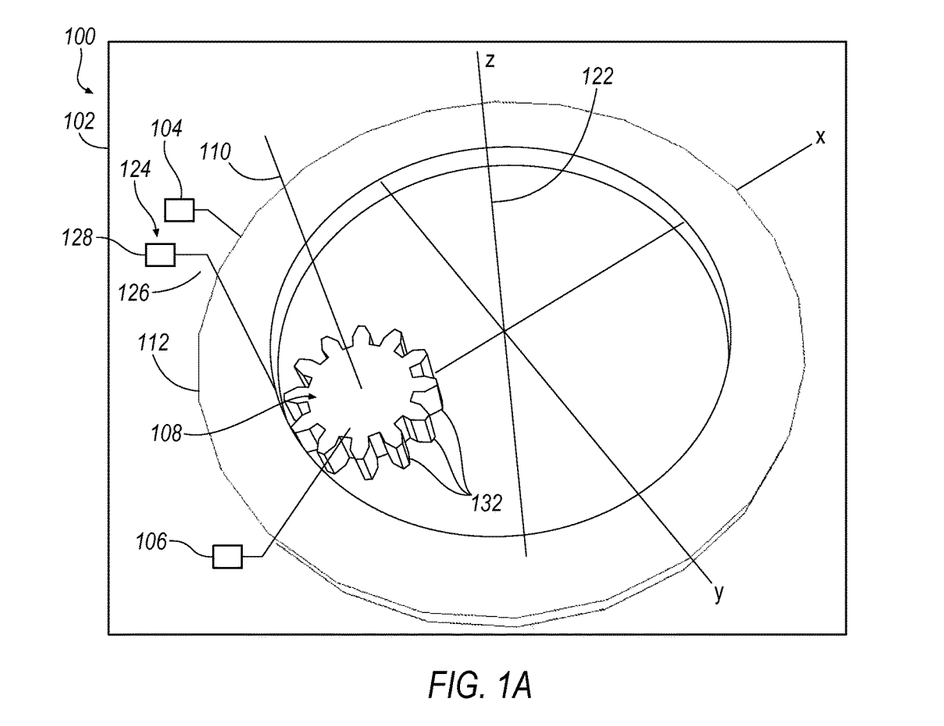
FIG. 1A is a schematic, perspective view of an exemplary involute gear cutter system including a modified tooth proportion gear cutter that is configured to cut an internal gear in a blank orientation.
Figure 1B:
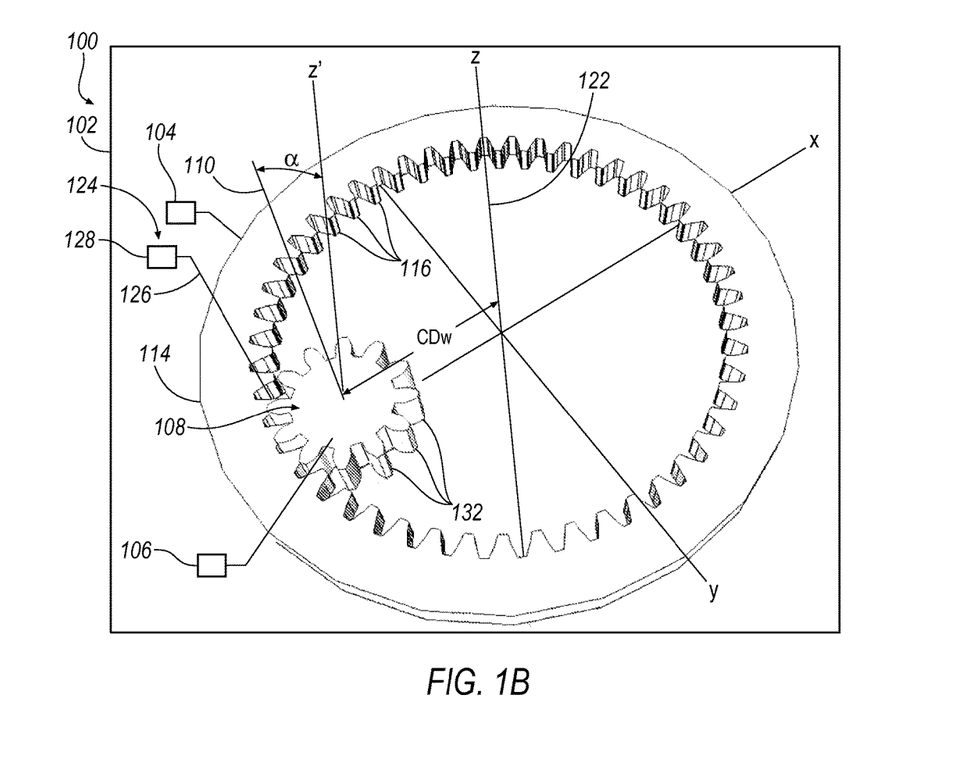
FIG. 1B is a schematic, perspective view of the system of FIG. 1A, illustrating the cutter having produced a precision internal gear in a final orientation.
Figure 7:
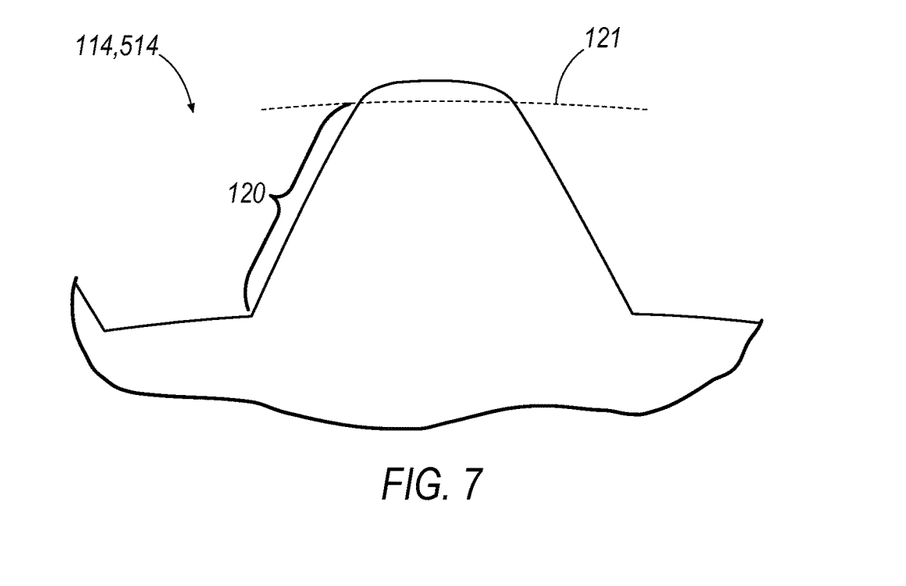
FIG. 7 is an enlarged view of the active profile section shown in FIG. 4.

Referring to FIGS. 1A, 1B, 2 and 3, an exemplary system 100 includes a computer numerically controlled (CNC) lathe 102 having in part a chuck 104 and a spindle 106. The system 100 further includes a cutter 108 that is attached to the spindle 106, which is in turn configured to rotate the cutter 108 about a cutting axis 110 so as to cut a gear 112 in a blank orientation (FIG. 1A) and produce the gear 114 in the final orientation (FIG. 1B). The cutter 108 in this form is an external gear configured to cut an internal gear 112 in a blank orientation to produce the internal gear 114 in the final orientation. However, in other examples, the cutter can be configured to cut an external gear in a blank orientation or any other suitable blank configurations. The internal gear 114 in the final orientation has a plurality of cut teeth 116, and the teeth 116 have an involute tooth profile 118 including an active profile section 120, which is a portion of each tooth surface configured to contact the opposing teeth of a meshed gear. In particular, as shown in FIG. 7, the active profile 120 terminates at or is limited by the true involute form diameter 121.

Figure 2:
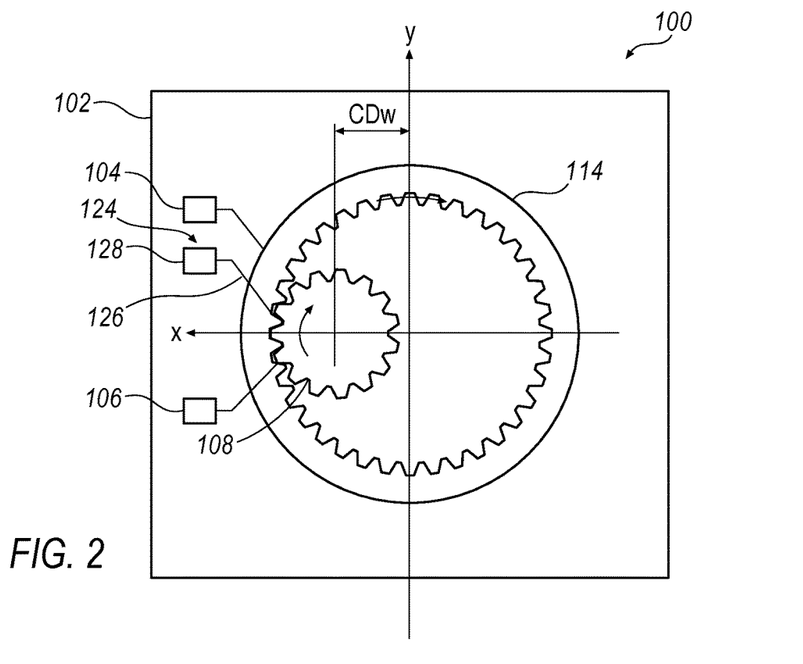
FIG. 2 is a schematic end view of the system of FIG. 1A, illustrating a center distance between an axis of rotation of the cutter and an axis of rotation of the internal gear.
Figure 3:
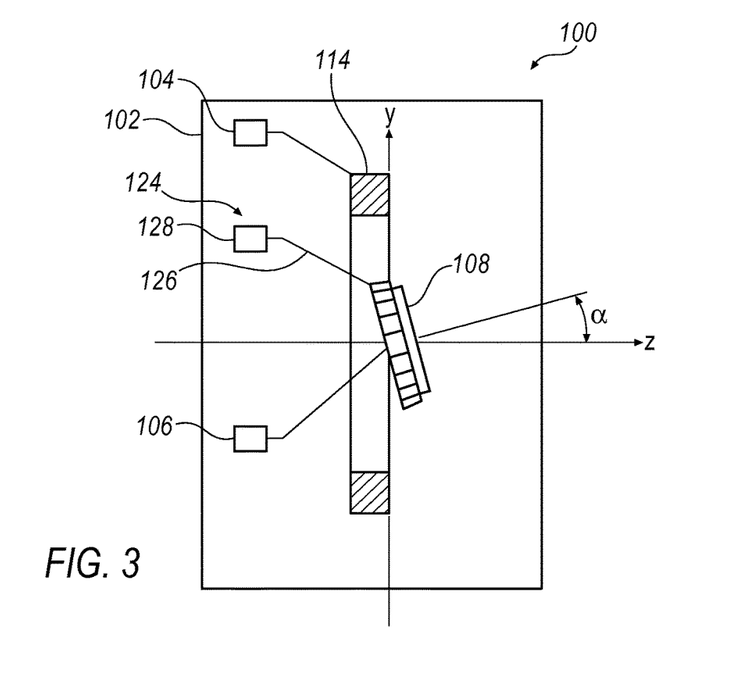
FIG. 3 is a schematic side view of the cutter and the internal gear of FIG. 1A, illustrating a cross-axis angle between an axis of rotation for the cutter and an axis of rotation for the internal gear.

The gear 112 in the blank orientation is mounted to the chuck 104, which is configured to rotate the gear 112 about a cut axis 122, such that the cut axis 122 and the cutting axis 110 are spaced apart from one another by a center distance $CD_w$ (FIGS. 1B and 2). Moreover, the cut axis 122 and the cutting axis 110 are disposed at a cross-axis angle α (FIGS. 1B and 3) with respect to one another when the gear 114 is in the final orientation. The system 100 can further include a flushing device 124 configured to deliver a fluid to the gear 112 to remove shavings, chips or dust from the gear 112 when the spindle 106 rotates the cutter 108 to cut the gear 112 in multiple passes. The fluid can also remove heat from the system 100. In one example, the flushing device 124 is a fluid line 126 communicating with a reservoir 128 to supply water, nitrogen gas or another fluid to the internal gear 112. In the final orientation, the gear 114 has an involute tooth profile 118 including a plurality of cut teeth 116 and a plurality of valleys 130 therebetween. The involute tooth profile 118 includes the active profile section 120, and the operating pitch diameter is spaced apart from the same when the gear 114 is in its final orientation.

Figure 4:
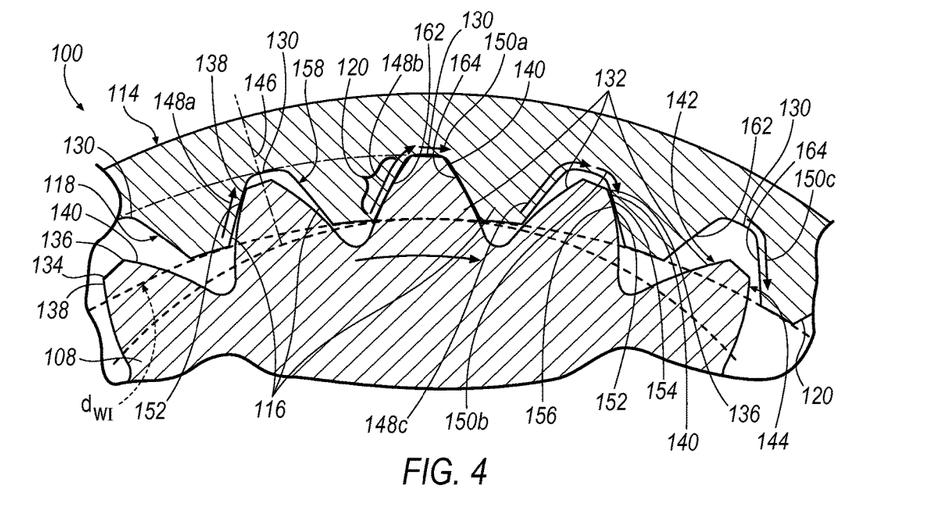
FIG. 4 is an enlarged cross-sectional view of one example of the system of FIG. 1A, having the cutter configured to produce the internal gear in its final orientation including an operating pitch diameter that is disposed entirely below or radially inward from the active profile section of the internal gear.
Figure 5:
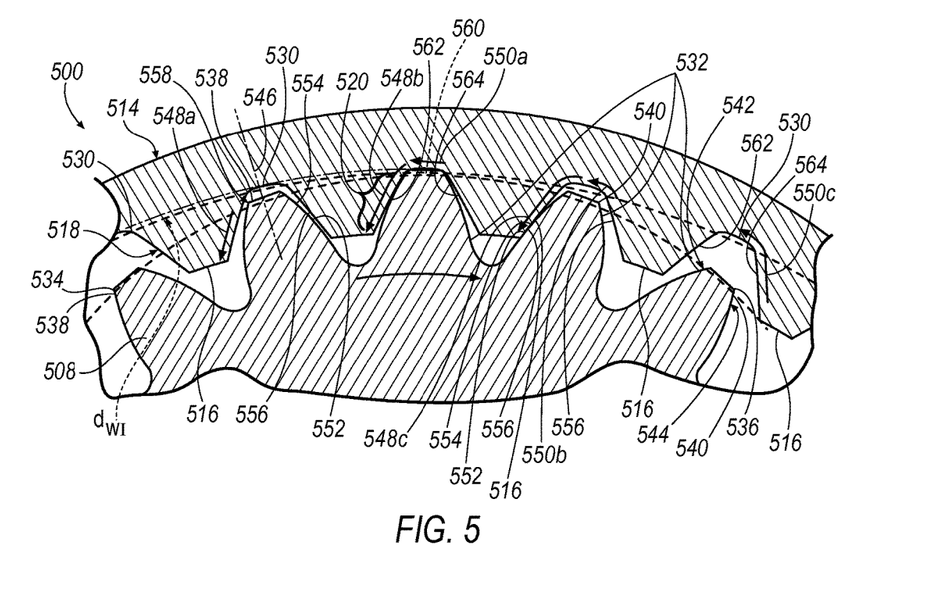
FIG. 5 is an enlarged cross-sectional view of another example of the system of FIG. 1A, having the cutter configured to produce the internal gear in its final orientation including a portion of an operating pitch diameter having a portion that is disposed above or radially outward from the active profile section of the internal gear at the mesh region.

Referring to FIGS. 4 and 5, two non-limiting examples of the cutting edges are configured to cut the gear in its blank orientation, such that gear in the final orientation has an operating pitch diameter that is spaced apart from the active profile section of the gear. Non-limiting exemplary benefits corresponding with these configurations include the manufacture of precision gear machinery within minimal tolerances.

Referring to FIG. 4, the cutter 108 is an external gear cutter 108 having a plurality of involute cutting teeth 132. Each one of the cutting teeth 132 can have a pair of cutting edges 134, 136 that are configured to cut the gear 112 in the blank orientation (FIG. 1A) and produce the gear 114 in its final orientation (FIG. 1B) having an operating pitch diameter $d_{wI}$ spaced apart from the active profile section 120. In one example, the gear cutter 108 and the internal gear 112 are generally configured to provide the operating pitch diameter $d_{wI}$ based on the center distance $CD_w$ (FIG. 1) between the internal gear 114 and the external gear cutter 108, the number of external cutting teeth $z_E$, and the number of internal cut teeth $z_I$ on the gear 114, as follows in Equation (1):

$$d_{wI} = \frac{2*CD_w}{1-(z_E/z_I)} \quad \text{Eqn. (1)}$$

Thus, the gear 114, the center distance $CD_w$, the number of cutting teeth $z_E$, and the number of cut teeth $z_I$ are configured to provide an operating pitch diameter $d_{wI}$ that is spaced apart from the active profile section 120 of the involute tooth profile 118 for the gear 114 in its final orientation. Other exemplary systems may include any suitable configuration of the cutter, the internal gear or a combination of both, which provide the operating pitch diameter of the internal gear that is spaced either radially inward or radially outward from the active profile section. Thus, the cutter can apply a generally constant cutting force in a single direction along the working depth of each tooth face, which can in turn provide precision gear machinery. Equation (1) is valid for a spur gear 114 which has no helix angle.

For an internal gear 114 having a non-zero helix angle, such as a helical gear, the calculated operating pitch diameter during manufacturing in the transverse plane is defined by Equation (2) as:

$$d_{wI} = \frac{s_{wI,t}}{\left(\frac{s_{oI,t}}{d_{oI}} + inv\alpha_{o,t} - inv\alpha_{w,t}\right)} \quad \text{Eqn. (2)}$$

where, $s_{oI,t}$ is the circular space width of the internal gear at the pitch circle diameter and transverse plane, $d_{oI}$ the internal gear pitch circle diameter, and $inv\alpha_{o,t}$ the involute angle in radians at the pitch circle diameter and transverse plane, which is given by Equation (3) as:

$$inv\alpha_{o,t} = \tan\alpha_{o,t} - \alpha_{o,t} \quad \text{Eqn. (3)}$$

where $\alpha_{o,t}$ is the transverse pressure angle at the pitch circle diameter that is calculated as in Equation (4) as:

$$\alpha_{o,t} = \tan^{-1}(\tan\alpha_o/\cos\beta_o) \quad \text{Eqn. (4)}$$

where $\alpha_o$ is the normal pressure angle taken at the pitch circle diameter, $\beta_o$ the helix angle taken at the pitch circle diameter, $inv\alpha_{w,t}$ the involute angle in radians at the operating pitch diameter and transverse plane, which is given by Equation (5) as:

$$inv\alpha_{w,t} = \tan\alpha_{w,t} - \alpha_{w,t} \quad \text{Eqn. (5)}$$

where $\alpha_{w,t}$ is the transverse pressure angle at the pitch circle diameter. The transverse pressure angle at the pitch circle diameter is calculated as in Equation (6) as:

$$\cos\alpha_{w,t} = \frac{d_{bI}}{d_{wI}} \quad \text{Eqn. (6)}$$

where $d_{bI}$ is the base circle diameter of the internal gear. A circular tooth thickness of the external cutter at pitch circle diameter, $t_{oE}$, is calculated as:

$$t_{oE,t} = d_{oE} * \left(\frac{s_{wI,t}}{d_{wE}} + inv\alpha_{w,t} - inv\alpha_{o,t}\right) \quad \text{Eqn. (7)}$$

where $d_{oE}$ is the pitch circle diameter of the external cutter.

The pair of cutting edges 134, 136 can include an approach cutting edge 138 and a recede cutting edge 140, which are disposed on opposing sides 142, 144 of each cutting tooth 132. In this example, the approach cutting edge 138 is disposed on a side 142 of the cutting tooth 132 in the direction in which the cutter is rotated, and the recede cutting edge 140 is disposed on the side 144 of the cutting tooth 132 opposite to the direction in which the cutter 108 is being rotated. The approach cutting edge 138 is configured to cut the gear 112 in the blank orientation and provide one of two portions of the involute tooth profile 118 in each valley 130, and the recede cutting edge 140 is configured to cut the gear 112 in the blank orientation to provide the other of two portions of the involute tooth profile 118 in each valley 130. In this example, the approach cutting edge 138 and the recede cutting edge 140 are configured to cut the gear 112 in the blank orientation, such that the approach cutting edge 138 provides one flank of the involute tooth profile 118 on one side of a centerline 146 of each valley 130, and the recede cutting edge 140 provides the other flank of the involute tooth profile 118 on the other side of the centerline 146 in each valley 130 when the gear 114 is in the final orientation. The arrows 148a, 148b, 148c indicate the portions of each valley 130 on one side of the centerline 146 that are cut by the corresponding approach cutting edge 138 within the same valley 130 at the illustrated rotational position of the cutter 108, and the arrows 150a, 150b, 150c indicate the portions of each valley 130 on the other side of the centerline 146 that are cut by the corresponding recede cutting edge 140. In one example, the cutter 108 and the gear 114 may be configured to provide the active profile section 120 and the operating pitch diameter $d_{wI}$ spaced apart from one another, such that each point of contact 152 between the cut teeth 116 and the cutting teeth 132 includes a portion 154 of the cutting teeth 132 sliding along a portion 156 of the cut teeth 116. Thus, the gear cutter 108 and the internal gear 112 are configured, such that none of the points of contact 154 includes a portion 154 of the cutting teeth 132 and a portion 156 of the cut teeth 116 that are in stationary contact with one another within the active profile 120.

Referring to FIG. 4, the cutting teeth 132 are configured to cut the gear 112 in the blank orientation, such that the operating pitch diameter $d_{wI}$ is disposed entirely radially inward from the active profile section 120 when the gear 112 is disposed in the final orientation. In particular, while the cutter 108 rotates in a clockwise direction as shown in FIG. 4, the approach cutting edge 138 is configured to cut the gear 114 in the blank orientation in a single or unilateral direction extending radially outward with respect to the rotational axis of the gear 112, and the recede cutting edge 140 is configured to cut the gear 112 in a single or unilateral direction extending radially inward with respect to the rotational axis of the gear 112.

The cutting edges 134, 136 are configured to cut the gear 112 in multiple passes and may provide a symmetrical involute profile 158 about the centerline 146 within each valley 130. In particular, each cutting tooth 132 can make several passes, cutting multiple portions of the gear 112 to provide in part multiple valleys 130 of the gear 114 in its final orientation. In one example, the cutter 108 may use the cutting teeth 132 to make 7 to 14 passes to make each valley 130 depending on the cycle time selected by the manufacturer. However, more or fewer passes can be used to form each valley 130.

The cutter 108 can be made of powdered metal or solid carbide, and the cutter can have a hardness that is 64 to 66 on the Rockwell C hardness scale. Moreover, the gear 112 can be made of a metal having a hardness that is 180 to 200 on the Brinell hardness scale. As another example, the gear 112 can instead have a hardness that is 58 to 62 on the Rockwell C hardness scale when a cutter that is made of carbide skives the gear 112 in the blank orientation. However, the cutter or the gear can be made of any suitable material having hardness above or below these ranges so long as the material of the cutter is harder than the material of the gear.

Referring to FIG. 5, a cutter 508 having cutting teeth 532 is substantially similar to the cutter 108 having cutting teeth 132 as shown in FIG. 4, and the cutter 508 has substantially similar features identified by corresponding reference numerals in the 500 series. However, the operating pitch diameter $d_{wI}$ of the gear in its final orientation is not disposed entirely radially inward from the active profile section 520. Rather, the cutting teeth 532 are configured to cut the gear 512 in its blank orientation, such that a portion of the operating pitch diameter $d_{wI}$ is disposed radially outward from the active profile section 520 of the gear 514 at a mesh region 560 between the cutting teeth 532 and the cut teeth 516 when the gear 514 is disposed in the final orientation. Moreover, while the approach cutting edge 138 of FIG. 4 is disposed on a leading face of each cutting tooth 132, the approach cutting edge 538 may disposed on a trailing face of each cutting tooth 532 opposite to the direction in which the cutter 508 is rotated. Thus, the arrows 548a, 548b, 548c indicate the portions of each valley 530 on one side of the centerline 546 that are cut by the corresponding approach cutting edge 538 within the same valley 530 at the rotational position of the cutter 508 of FIG. 5, and the arrows 550a, 550b, 550c indicate the portions of each valley 530 on the other side of the centerline 546 that are cut by the corresponding recede cutting edge 540 within the same valley 530 at the illustrated rotational position of the cutter 508. Furthermore, while the recede cutting edge 140 of FIG. 4 may be disposed on a trailing face of each cutting tooth 132, the recede cutting edge 540 may be disposed on the leading face of each cutting tooth 532 as viewed in the direction in which the cutter 508 is rotated. Thus, while the cutter 508 rotates in a clockwise direction as shown in FIG. 5, the approach cutting edge 538 is configured to cut the gear 514 in the blank orientation in a single or unilateral direction extending radially outward with respect to the rotational axis of the gear 112.

Figure 6:
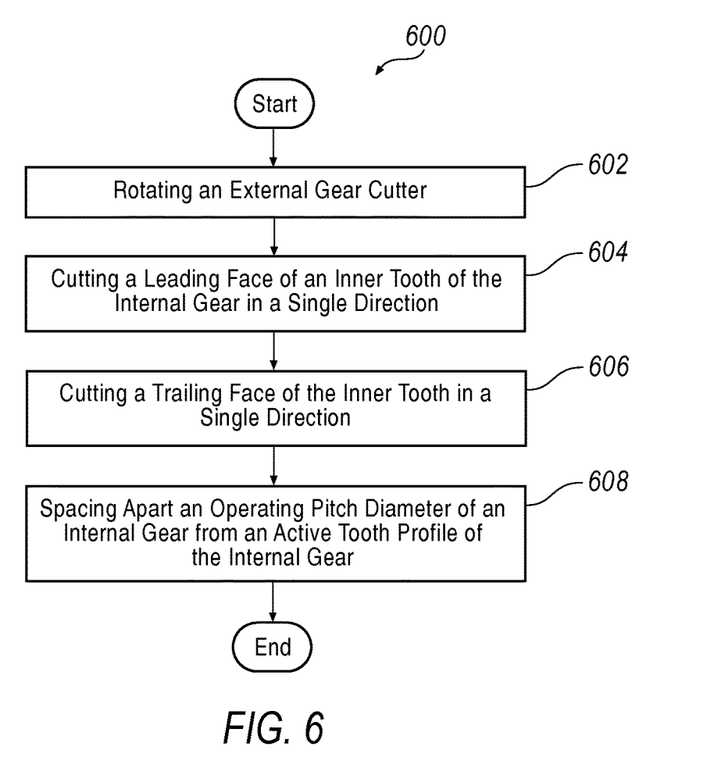
FIG. 6 is a flowchart for a method for operating the cutter of FIG. 1A to produce a precision internal gear in a final orientation.

Referring to FIG. 6, there is illustrated a flowchart of an exemplary method 600 for operating the gear cutter 108 of FIGS. 1A and 1B to machine the gear 112 in its blank orientation into the internal gear 114 in its final orientation. At step 602, the gear cutter 108 is rotated and applied to the gear 112 in its blank orientation. For instance, the gear cutter 108 may be attached to the spindle 106, and the gear 112 may be attached to the chuck 104. The cutter 108 can make multiple passes, incrementally removing shavings, chips, dust or other particles of material from the gear 112 in its blank orientation. As one non-limiting example, the cutter 108 may use the cutting teeth 132 to make 7 to 14 passes to make each valley 130, and the flushing device 124 may supply a stream of nitrogen gas, fluid or coolant to the point of contact between the cutter 108 and the gear 112 so as to remove the shavings, chips, dust or other particles removed from the gear 112. The shavings may be 0.0010 inches thick, but the shavings may be other sizes depending on at least the cycle time selected by the manufacturer.

At step 604, the gear cutter 108 cuts the leading face of each inner tooth in a single direction extending either radially outward with respect to the rotational cut axis 122 of the gear 112 or in the opposite direction radially inward with respect to same. In particular, as shown in FIG. 4, the approach cutting edge 138 may cut the leading face 162 in a single direction 148a, 148b, 148c extending radially outward with respect to the cut axis 122. Referring to the example shown in FIG. 5, the approach cutting edge 538 may cut the leading face 562 in a single direction 548a, 548b, 548c extending radially inward with respect to the rotational cut axis. Additionally, the approach cutting edge may cut the gear in the blank orientation so as to provide one flank of the involute tooth profile on one side of the centerline within each valley.

At step 606, the cutter cuts the trailing face of each inner tooth in a single direction extending either radially inward with respect to the cut axis or in the opposite direction radially outward with respect to the same. Referring to the example shown in FIG. 4, the recede cutting edge 140 may cut the trailing face 164 in a single direction 150a, 150b, 150c extending radially inward with respect to the cut axis. Referring to the example shown in FIG. 5, the recede cutting edge 540 may cut the trailing face 564 in a single direction 550a, 550b, 550c extending radially outward with respect to the cut axis. The approach cutting edge may cut the gear in the blank orientation so as to provide one flank of the involute tooth profile on a side of the centerline within each valley that is opposite to the side cut by the approach cutting edge.

At step 608, the operating pitch diameter $d_{wI}$ and the active profile section 120 of the internal gear 112 are spaced apart from one another. In particular, in the example as shown in FIG. 4, this step can be accomplished by cutting the gear 112 in the blank orientation, such that the gear 114 in the final orientation includes the operating pitch diameter $d_{wI}$ spaced entirely radially inward from the active profile section 120. As another example, this step may be accomplished by cutting the gear 514 in the blank orientation, such that the gear 514 in the final orientation has the portion of the operating pitch diameter $d_{wI}$ spaced radially outward from the active profile section 520 at the mesh region 560 between the cutting teeth 532 and the internal teeth 516. However, other suitable configurations of the cutter, the internal gear or a combination of both can provide the gear 114 in the final orientation having the operating pitch diameter $d_1$ and the active profile section 120 that are spaced apart from one another.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A modified tooth proportion gear cutter, comprising:
   a gear cutter having a plurality of cutting teeth, and each one of the cutting teeth has a pair of cutting edges configured to cut a gear in a blank orientation to provide the gear in a final orientation that has an involute tooth profile including a plurality of cut teeth and a plurality of valleys therebetween;
   wherein the pair of cutting edges is configured to cut the gear in the blank orientation, such that the gear in the final orientation includes the involute tooth profile having an active profile section and an operating pitch diameter $d_{wI}$ that is spaced apart from the active profile section; and
   wherein the pair of cutting edges is configured to cut the gear in the blank orientation, such that the operating pitch diameter is disposed entirely radially inward from the active profile section when the gear is disposed in the final orientation.

2. The modified tooth proportion gear cutter of claim 1 wherein each one of the cutting edges is configured to cut a surface of the gear in the blank orientation in a unilateral direction along the surface.

3. The modified tooth proportion gear cutter of claim 1 wherein the pair of cutting edges includes an approach cutting edge and a recede cutting edge that are disposed on opposing sides of each one of the cutting teeth, such that the approach cutting edge is configured to cut the gear in the blank orientation and provide one of two portions of the involute tooth profile in each one of the valleys, and the recede cutting edge is configured to cut the gear in the blank orientation to provide the other of two portions of the involute tooth profile in each one of the valleys.

4. The modified tooth proportion gear cutter of claim 3, wherein the approach cutting edge and the recede cutting edge are configured to cut the gear in the blank orientation so as to provide the involute tooth profile having a symmetrical involute profile in each one of the valleys when the gear is in the final orientation.

5. The modified tooth proportion gear cutter of claim 3, wherein the approach cutting edge and the recede cutting edge are configured to cut the gear in the blank orientation, such that the approach cutting edge provides one flank of the involute tooth profile on one side of a centerline in each one of the valleys, and the recede cutting edge provides the other flank of the involute tooth profile on the other side of the centerline in each one of the valleys when the gear is in the final orientation.

6. The modified tooth proportion gear cutter of claim 1 wherein the cutting teeth are configured to cut the gear in the blank orientation in a plurality of passes, such that each one of the cutting teeth provide in part the plurality of valleys of the gear in the final orientation.

7. The modified tooth proportion gear cutter of claim 1 wherein one of the cutting edges on each one of the cutting teeth is configured to cut the gear in the blank orientation in a single direction extending radially outward with respect to a rotational axis of the gear, and the other of the cutting edges is configured to cut the gear in the blank orientation in a single direction extending radially inward with respect to the rotational axis of the gear.

8. The modified tooth proportion gear cutter of claim 1 wherein the pair of cutting edges is configured to cut the gear in the blank orientation to provide the gear in the final orientation for a spur gear having the operating pitch diameter $d_{wI}$ based on a center distance $CD_w$ between the gear and the gear cutter, a number of cutting teeth $z_E$, and a number of cut teeth $z_1$ as follows:

$$d_{wI} = \frac{2 * CD_w}{1 - (z_E / z_I)}.$$

9. A modified tooth proportion gear cutter, comprising:
a gear cutter having a plurality of cutting teeth, and each one of the cutting teeth has a pair of cutting edges configured to cut a gear in a blank orientation to provide the gear in a final orientation that has an involute tooth profile including a plurality of cut teeth and a plurality of valleys therebetween;
wherein the pair of cutting edges is configured to cut the gear in the blank orientation, such that the gear in the final orientation includes the involute tooth profile having an active profile section and an operating pitch diameter $d_{wI}$ that is spaced apart from the active profile section; and
wherein the pair of cutting edges is configured to cut the gear in the blank orientation, such that a portion of the operating pitch diameter is disposed radially outward from the active profile section of the gear at a mesh region between the cutting teeth and the cut teeth when the gear is disposed in the final orientation.

10. The modified tooth proportion gear cutter of claim 9 wherein one of the cutting edges on each one of the cutting teeth is configured to cut the gear in the blank orientation in a single direction extending radially outward with respect to a rotational axis of the gear, and the other of the cutting edges is configured to cut the gear in the blank orientation in a single direction extending radially inward with respect to the rotational axis of the gear.

* * * * *